US008462480B2

(12) United States Patent
Gorczyca et al.

(10) Patent No.: US 8,462,480 B2
(45) Date of Patent: Jun. 11, 2013

(54) IN-LINE GAS IONIZER WITH STATIC DISSIPATIVE MATERIAL AND COUNTERELECTRODE

(75) Inventors: John Gorczyca, Lansdale, PA (US); King K. Miller, Philadelphia, PA (US); Roger J. Peirce, Bensalem, PA (US)

(73) Assignee: Illinois Tool Works Inc., Glenview, IL (US)

( * ) Notice: Subject to any disclaimer, the term of this patent is extended or adjusted under 35 U.S.C. 154(b) by 445 days.

(21) Appl. No.: 12/787,958

(22) Filed: May 26, 2010

(65) Prior Publication Data
US 2011/0292559 A1 Dec. 1, 2011

(51) Int. Cl.
*H05F 3/00* (2006.01)
(52) U.S. Cl.
USPC .......................................... 361/215
(58) Field of Classification Search
USPC .......................................... 361/215
See application file for complete search history.

(56) References Cited

U.S. PATENT DOCUMENTS

| 5,055,963 | A  | * | 10/1991 | Partridge .................. 361/231 |
| 6,454,839 | B1 | * | 9/2002  | Hagglund et al. ............ 96/67 |
| 6,563,110 | B1 |   | 5/2003  | Leri |
| 6,717,792 | B2 | * | 4/2004  | Gorczyca et al. ............ 361/212 |
| 2006/0150841 | A1 | | 7/2006 | Bachmeier et al. |
| 2009/0321306 | A1 | | 12/2009 | Rider et al. |

OTHER PUBLICATIONS

SIMCO Electronics Products Catalog, FusION™ Family, including In-Line FusION, Copyright © 2010 SIMCO, Publication No. 5201060 Rev. A, pp. 1, 18, 24 (3 pages).
Int'l Search Report issued Oct. 24, 2011 in Int'l Application No. PCT/US2011/037949; Written Opinion, 12 pages.

* cited by examiner

*Primary Examiner* — Stephen W Jackson
(74) *Attorney, Agent, or Firm* — Panitch Schwarze Belisario & Nadel LLP

(57) ABSTRACT

An in-line gas ionizer has a gas inlet, an ionizing chamber, and a gas outlet, wherein at least one of the gas outlet and the ionizing chamber comprises static dissipative material which may be connected to ground.

20 Claims, 6 Drawing Sheets

IN-LINE GAS IONIZER WITH STATIC DISSIPATIVE MATERIAL AND COUNTERELECTRODE

BACKGROUND OF THE INVENTION

Air ionization equipment is used in a variety of industries for the elimination of unwanted and potentially harmful static electricity. Ionizers operated in conjunction with compressed air or gas are available as one option for static control. For example, an "in-line" ionizer is placed downstream of a compressed air source for delivering, through a tube or the like, ionization to a target. In-line ionizers are particularly useful in environments with limited space and proximity to sensitive equipment. In-line ionizers further provide the benefit of inserting ionization inside the production process, rather than simply in a production space.

In electronics and semiconductor manufacturing industries specifically, vulnerability to static voltages has increased as the size of electronics and semiconductor devices has shrunk. Thus, in-line ionization devices must continue to improve both the speed with which static is eliminated and the offset voltages produced by the ionizer itself. For example, some present in-line direct current (DC) ionizers can typically achieve worst-case balance offsets of ±50-60 volts (V). These ionizers conventionally include chambers made from plastic insulating material (e.g., polyethylene terephthalate (PET) or polytetrafluoroethylene (PTFE)) or anodized metal. The outlets typically consist of insulative material (e.g., PET, PTFE), anodized metal, or metal. Outlets constructed of insulative materials tend to charge due to the air flow, and cause imbalances. Outlets constructed of metal draw the ionization out of the air, reducing the amount of ionization available for neutralization, causing poor performance.

It is therefore desirable to provide an in-line gas ionizer with greatly reduced balance offset while maintaining good discharge speeds. The present invention fulfills this need.

BRIEF SUMMARY OF THE INVENTION

Briefly stated, an embodiment of the present invention includes an in-line gas ionizer having a gas inlet, an ionizing chamber, and a gas outlet, wherein the gas outlet comprises static dissipative material which is connected to ground.

Another embodiment of the present invention includes an in-line gas ionizer having a gas inlet, an ionizing chamber, and a gas outlet, wherein the ionizing chamber comprises static dissipative material.

Yet another embodiment of the present invention includes an in-line gas ionizer having a gas inlet, an ionizing chamber, and a gas outlet, wherein the ionizing chamber and the gas outlet each comprise static dissipative material.

A still further embodiment of the present invention includes an in-line DC gas ionizer having a gas inlet, an ionizing chamber, and a gas outlet, wherein the ionizing chamber includes positive and negative ion emitters, and a counterelectrode. The counterelectrode is movable with respect to the positive and negative ion emitters so as to adjust the balance in the output ionization.

BRIEF DESCRIPTION OF THE DRAWINGS

The foregoing summary, as well as the following detailed description of preferred embodiments of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

DETAILED DESCRIPTION OF THE INVENTION

Figure 1:
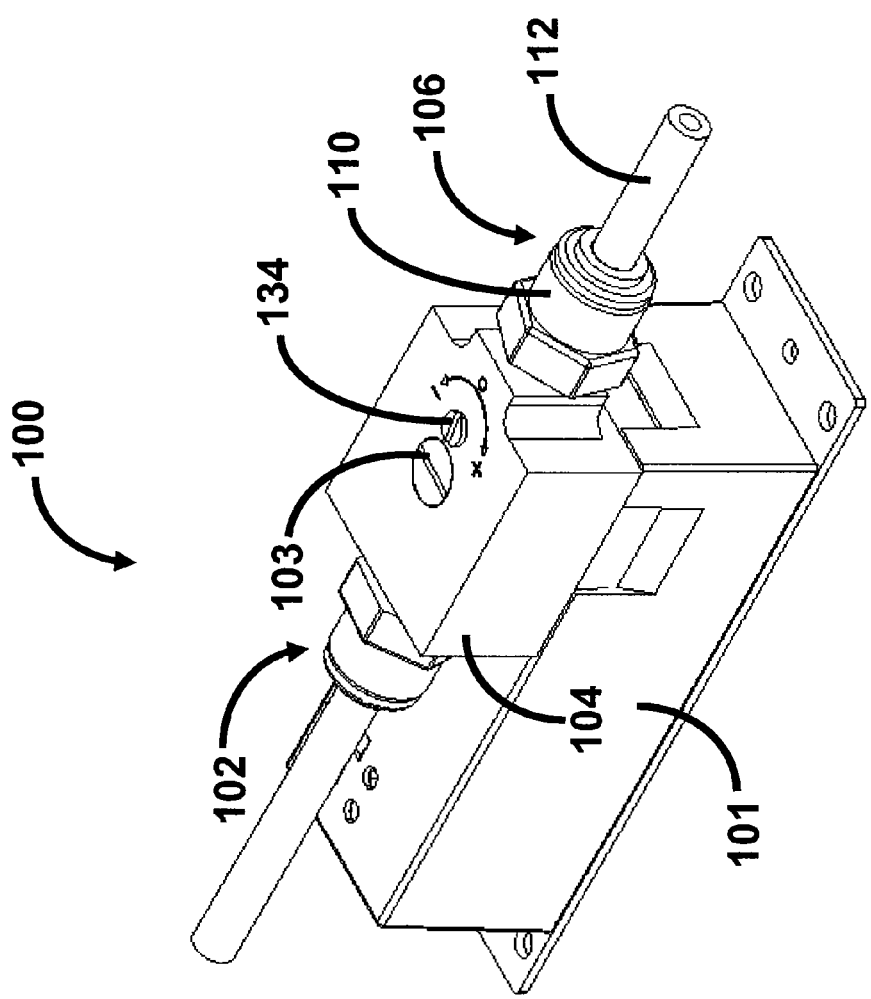
FIG. 1 is a perspective view of an in-line gas ionizer in accordance with preferred embodiments of the present invention.

Certain terminology is used in the following description for convenience only and is not limiting. Additionally, the words "a" and "an", as used in the claims and in the corresponding portions of the specification, mean "at least one." In the drawings, the same reference numerals indicate like elements throughout.

Figure 2:
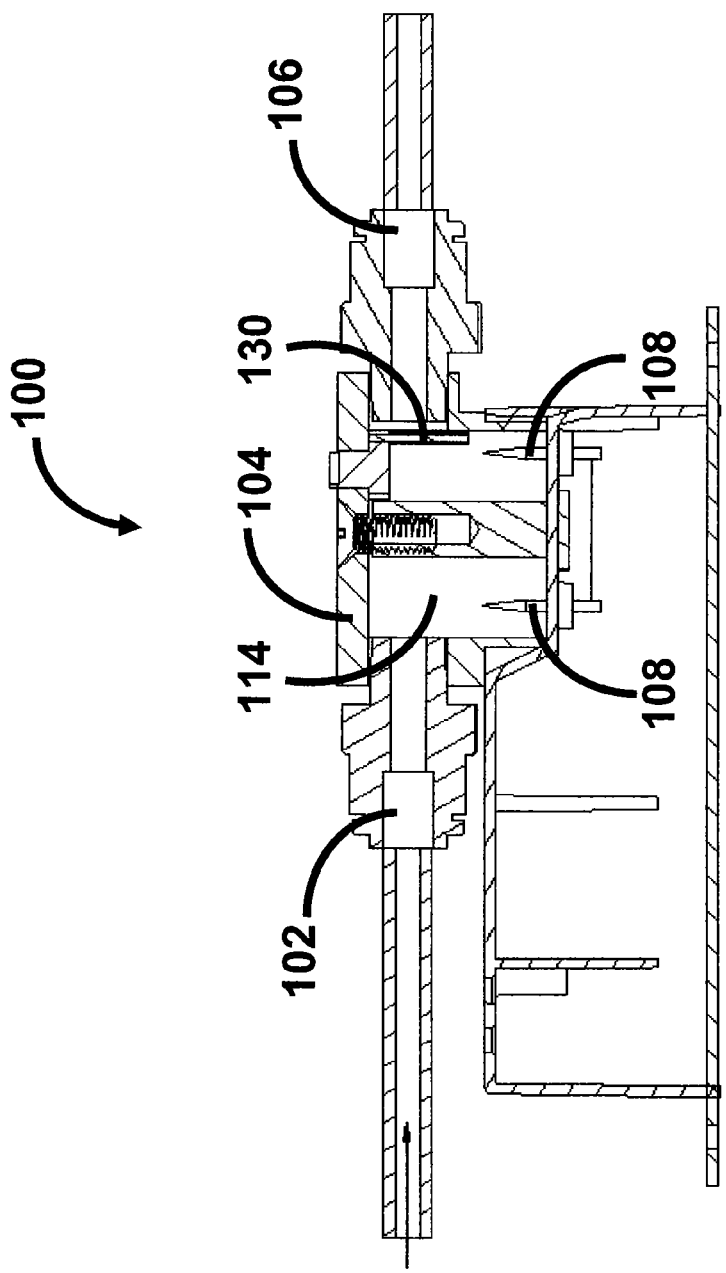
FIG. 2 is a partial cross-sectional side elevational view of the in-line gas ionizer of FIG. 1.

FIG. 1 shows an in-line gas ionizer 100 for use in preferred embodiments of the present invention. The in-line gas ionizer 100 includes a gas inlet 102, an ionizing chamber 104, and a gas outlet 106. The ionizing chamber 104 is preferably coupled to a base 101, using a screw 103, threaded pole, or the like. The base 101 may seal the ionizing chamber 104 from the underside, or the ionizing chamber 104 may already be sealed prior to coupling with the base 101. As can be seen from FIG. 2, gas from a compressed air source (not shown) enters the in-line gas ionizer 100 through the gas inlet 102 and proceeds to the ionizing chamber 104. Within the chamber 104, the gas passes over one or more ion emitters 108 to ionize the gas. The gas then exits the in-line gas ionizer 100 through the gas outlet toward the desired neutralization target (not shown).

The gas outlet 106 preferably comprises a static dissipative material that is connected to ground. The static dissipative material is a material having a surface resistance of between about $1 \times 10^5$ ohms ($\Omega$) and about $1 \times 10^{11} \Omega$. Preferably, the surface resistance is between about $1 \times 10^9 \Omega$ and $1 \times 10^{11} \Omega$, and more preferably, the surface resistance is about $1 \times 10^{11} \Omega$. The static dissipative material is preferably a static dissipative acetal copolymer (polyoxymethylene) having a surface resistance as described above. As is conventionally known, ground is not necessarily 0 V, but can be some non-zero designated potential to which the gas outlet 106 is connected to achieve the same effect.

Preferably the gas outlet 106 is constructed from the static dissipative material, meaning that the gas outlet 106 is homogeneous throughout. However, the gas outlet 106 may have only a portion thereof constructed from the static dissipative material. Alternatively, at least a portion of the gas outlet 106 may be coated with the static dissipative material. Preferably, the entire gas outlet 106 is coated with the static dissipative material. In still another embodiment, the gas outlet 106 may include a fitting 110 and an output tube 112, at least one of which comprises the static dissipative material that is connected to ground.

In another embodiment, the ionizing chamber 104 comprises the static dissipative material, wherein the preferred material and surface resistances are identical to those described above with respect to the gas outlet 106. Like the gas outlet 106, the ionizing chamber 104 comprising the static dissipative material is preferably connected to ground, but need not be. The ionizing chamber 104 is preferably constructed from the static dissipative material. Alternatively, at least a portion of the interior 114 of the ionizing chamber 104 may be coated with the static dissipative material.

Figure 3:
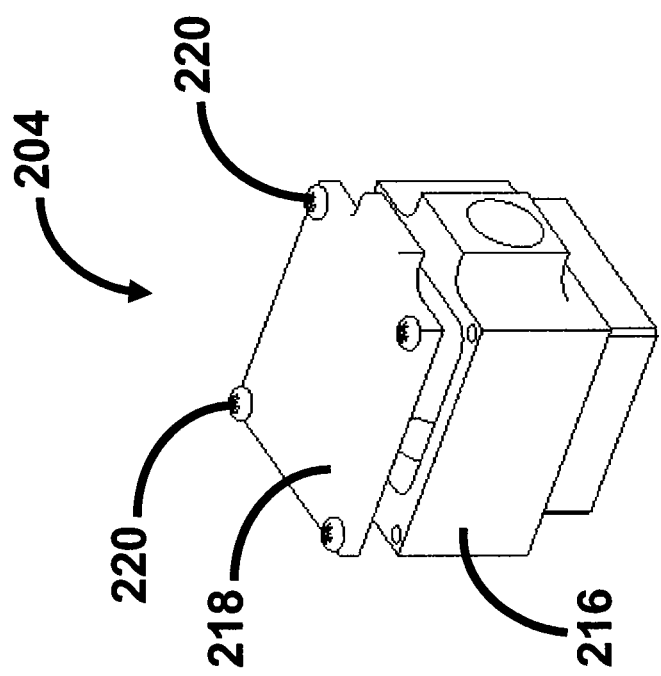
FIG. 3 is an exploded perspective view of an ionization chamber in accordance with an embodiment of the present invention.
Figure 4:
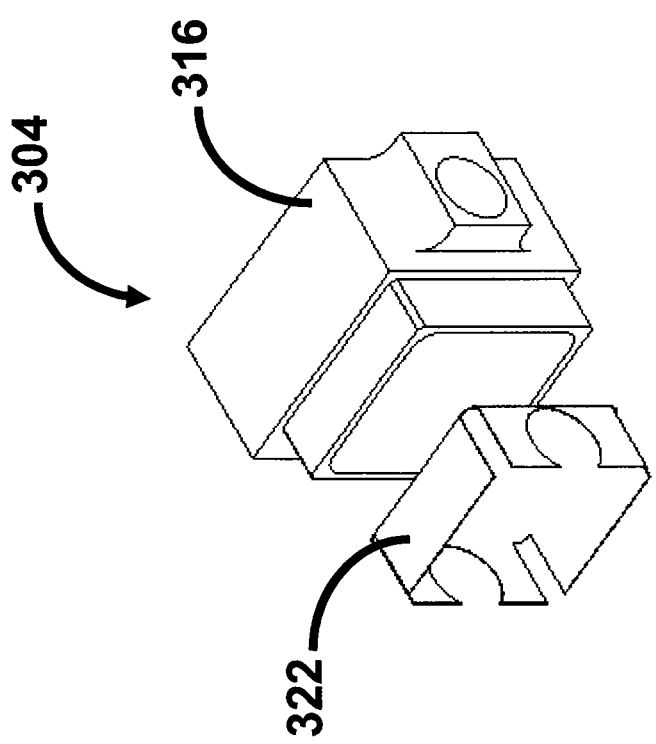
FIG. 4 is an exploded perspective view of an ionization chamber in accordance with another embodiment of the present invention.

Referring to FIGS. 3 and 4, the ionizing chamber 104 may be constructed from a plurality of parts, at least one of which comprises the static dissipative material (by coating, construction, or the like). For example, FIG. 3 shows an ionizing chamber 204 having a chamber portion 216 and a cover 218 attached to the chamber portion 216 by a plurality of screws 220. The chamber portion 216, the cover 218, or both may comprise the static dissipative material in accordance with embodiments of the invention. FIG. 4 shows another configuration wherein the ionizing chamber 304 includes a chamber portion 316 and an insert 322 that is placed within the chamber portion 304. Either or both may comprise the static dissipative material. The insert 322 may take any shape or form to fit within the chamber portion 316.

Figure 5:
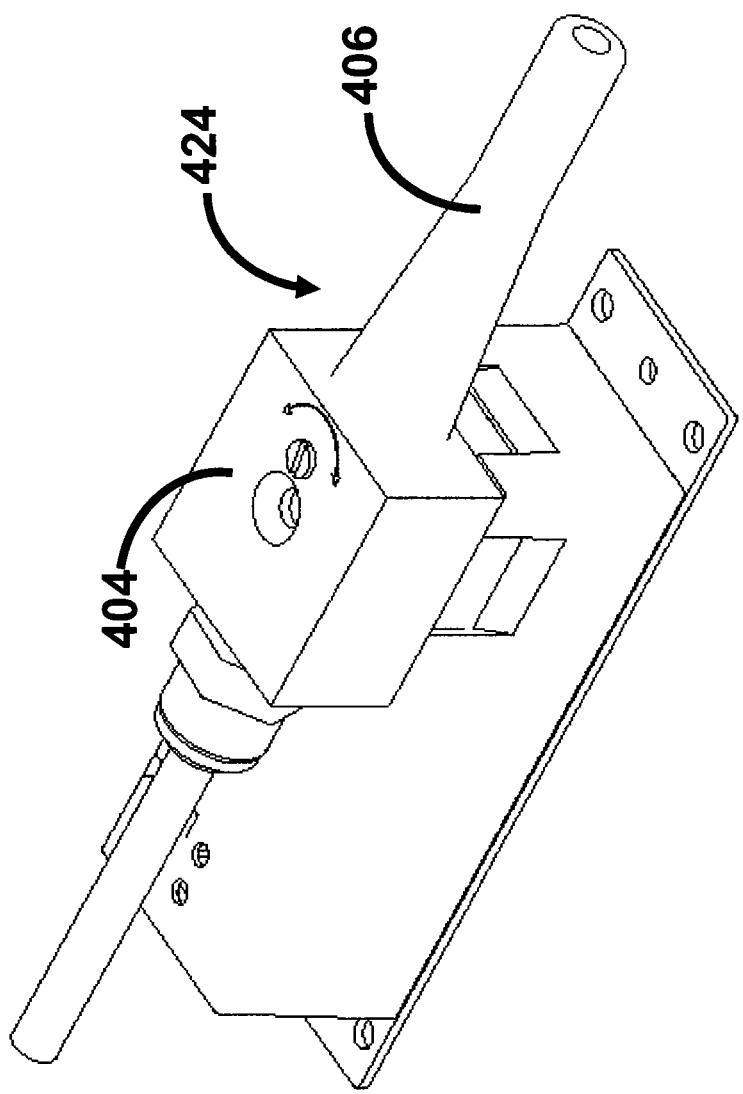
FIG. 5 is a perspective view an in-line gas ionizer in accordance with a preferred embodiment of the present invention.

In one preferred embodiment, both the ionizing chamber 104 and the gas outlet 106 comprise the static dissipative material. This embodiment may be accomplished by combinations of the configurations described above for the ionizing chamber 104 and the gas outlet 106. Additionally, FIG. 5 shows an ionizing chamber 404 and gas outlet 406 as a unitary structure 424, which may be formed by injection molding or the like.

With one or both of the ionizing chamber 104 and the gas outlet 106 being comprised of the static dissipative material, worst-case balance offsets can be reduced to about ±20 V.

In another embodiment of the present invention, the in-line gas ionizer 100 includes positive and negative ion emitters 108 and a counterelectrode 130. The counterelectrode 130 is movable with respect to the positive and negative ion emitters 108 so as to adjust the balance in the output ionization. Preferably the positive and negative ion emitters 108 are fixed and the counterelectrode 130 is movable.

Figure 6:
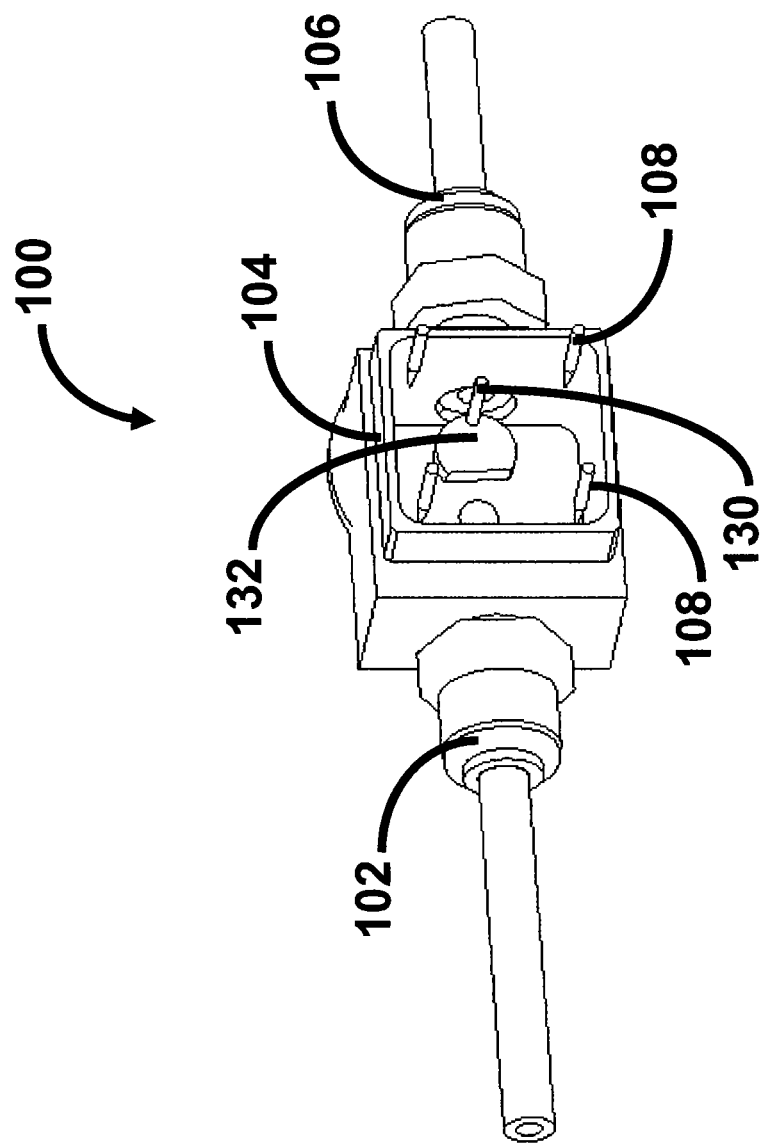
FIG. 6 is a partial bottom perspective view of the in-line gas ionizer of FIG. 1.

For example, FIG. 6 shows the counterelectrode 130 as a pin disposed in the ionizing chamber 104 coupled to a rotatable platform 132. The pin 130 is preferably a metal or semiconductor, such as tungsten, titanium, stainless steel, silicon, silicon carbide, or the like. Other suitable conductive materials may also be used. The platform 132 may be rotated from the exterior of the in-line gas ionizer 100 by turning an adjustment screw 134. Rotating the platform 132 moves the pin 130 closer to one of the positive and negative emitters 108, where the pin 130 will draw away the produced ions, thus permitting an adjustment to balance the output ionization to a negative value, positive value, or zero. The pin is preferably connected directly or indirectly to ground.

It is understood that other arrangements for moving the counterelectrode 130 with respect to the positive and negative ion emitters 108 may be implemented without deviating from the invention. Further, the counterelectrode 130 may be fixed while the positive and negative ion emitters 108 are movable. Embodiments of the invention also contemplate multiple counterelectrodes 130, one or more of which may be movable with respect to the positive and negative emitters 108.

The counterelectrode 130 may be utilized separately or in conjunction with the ionizing chamber 104 and/or gas outlet 106 comprised of the static dissipative material. By utilizing the disclosed embodiments of the invention together, the worst-case balance offset for the in-line gas ionizer 100 can be reduced to as little as ±5-10 V or less.

From the foregoing, it can be seen that embodiments of the present invention comprise an apparatus for detecting a static field. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An in-line gas ionizer having a gas inlet, an ionizing chamber, and a gas outlet, wherein the gas outlet comprises static dissipative material which is connected to ground and wherein the surface resistance is between about $1 \times 10^9 \Omega$ and $1 \times 10^{11} \Omega$.

2. The ionizer of claim 1 wherein the surface resistance is about $1 \times 10^{11} \Omega$.

3. An in-line gas ionizer having a gas inlet, an ionizing chamber, and a gas outlet, wherein the gas outlet comprises static dissipative material which is connected to ground and wherein the gas outlet is constructed from the static dissipative material.

4. The ionizer of claim 3 wherein the static dissipative material is static dissipative acetal copolymer.

5. An in-line gas ionizer having a gas inlet, an ionizing chamber, and a gas outlet, wherein the gas outlet comprises static dissipative material which is connected to ground and wherein at least a portion of the gas outlet is coated with the static dissipative material.

6. An in-line gas ionizer having a gas inlet, an ionizing chamber, and a gas outlet, wherein the gas outlet comprises static dissipative material which is connected to ground and wherein the gas outlet includes a fitting and an output tube and at least one of the fitting and the output tube comprises static dissipative material which is connected to ground.

7. An in-line gas ionizer having a gas inlet, an ionizing chamber, and a gas outlet, wherein the ionizing chamber comprises static dissipative material and wherein the surface resistance is between about $1 \times 10^9 \Omega$ and $1 \times 10^{11} \Omega$.

8. The ionizer of claim 7 wherein the surface resistance is about $1 \times 10^{11} \Omega$.

9. An in-line gas ionizer having a gas inlet, an ionizing chamber, and a gas outlet, wherein the ionizing chamber comprises static dissipative material and wherein the ionizing chamber is constructed from the static dissipative material.

10. The ionizer of claim 9 wherein the static dissipative material is static dissipative acetal copolymer.

11. An in-line gas ionizer having a gas inlet, an ionizing chamber, and a gas outlet, wherein the ionizing chamber comprises static dissipative material and wherein at least a portion of the interior of the ionizing chamber is coated with the static dissipative material.

12. An in-line gas ionizer having a gas inlet, an ionizing chamber, and a gas outlet, wherein the ionizing chamber comprises static dissipative material and wherein the ionizing chamber is constructed of a plurality of parts, and at least one of the parts comprises static dissipative material.

13. An in-line gas ionizer having a gas inlet, an ionizing chamber, and a gas outlet, wherein the ionizing chamber comprises static dissipative material and wherein the ionizing chamber is connected to ground.

14. An in-line gas ionizer having a gas inlet, an ionizing chamber, and a gas outlet, wherein the ionizing chamber comprises static dissipative material and wherein the ionizing chamber has an insert of static dissipative material.

15. An in-line gas ionizer having a gas inlet, an ionizing chamber, and a gas outlet, wherein the ionizing chamber and the gas outlet each comprise static dissipative material and wherein the ionizing chamber and the gas outlet are a unitary structure.

16. An in-line DC gas ionizer having a gas inlet, an ionizing chamber, and a gas outlet, wherein the ionizing chamber includes positive and negative ion emitters, and a counterelectrode, and wherein the counterelectrode is movable with respect to the positive and negative ion emitters so as to adjust the balance in the output ionization.

17. The ionizer of claim 16 wherein the positive and negative ion emitters are fixed and the counterelectrode is movable.

18. The ionizer of claim 17 wherein the counterelectrode is a pin disposed in the ionizing chamber.

19. The ionizer of claim 16 wherein the balance is one of negative, or zero, or positive.

20. The ionizer of claim 16 wherein the counterelectrode is connected to ground.

* * * * *